United States Patent
Nides et al.

(10) Patent No.: US 12,554,679 B2
(45) Date of Patent: Feb. 17, 2026

(54) SYSTEM AND METHOD FOR DETECTING SYSTEM EXECUTABLE ABNORMALITIES

(71) Applicant: KPMG LLP, New York, NY (US)

(72) Inventors: David Nides, Chicago, IL (US); Zachariah Sheldon Harris, Grand Rapids, MI (US); Andrea Sancho Silgado, Chicago, IL (US); Matthew Lewis Seyer, Castle Rock, CO (US)

(73) Assignee: KPMG LLP, New York, NY (US)

( * ) Notice: Subject to any disclaimer, the term of this patent is extended or adjusted under 35 U.S.C. 154(b) by 152 days.

(21) Appl. No.: 17/958,828

(22) Filed: Oct. 3, 2022

(65) Prior Publication Data

US 2023/0104516 A1  Apr. 6, 2023

Related U.S. Application Data

(60) Provisional application No. 63/261,966, filed on Oct. 1, 2021.

(51) Int. Cl.
*G06F 16/13* (2019.01)
*G06F 9/44* (2018.01)

(52) U.S. Cl.
CPC .............. *G06F 16/137* (2019.01); *G06F 9/44* (2013.01)

(58) Field of Classification Search
CPC .................................................. G06F 16/137
USPC ......................................................... 707/822
See application file for complete search history.

(56) References Cited

U.S. PATENT DOCUMENTS

| | | | |
|---|---|---|---|
| 8,655,844 B1 * | 2/2014 | Wong | G06F 11/1451 707/638 |
| 11,075,935 B2 | 7/2021 | Nides et al. | |
| 11,381,592 B2 | 7/2022 | Nides et al. | |
| 2003/0009484 A1 * | 1/2003 | Hamanaka | G06F 16/10 |
| 2005/0027686 A1 * | 2/2005 | Shipp | G06F 21/565 |

(Continued)

FOREIGN PATENT DOCUMENTS

WO  WO-2016101006 A1 *  6/2016  ....... G06F 17/30843

OTHER PUBLICATIONS

Assemblies, Metadata and Manifests. Aug. 8, 2019. 13 pages https://web.archive.org/web/20190808224930/http://condor.depaul.edu/sjost/nwdp/notes/overview/assemblies.htm (Year: 2019).*

*Primary Examiner* — Kimberly L Wilson
(74) *Attorney, Agent, or Firm* — HUNTON ANDREWS KURTH LLP (57) ABSTRACT

The invention relates to computer-implemented systems and methods that perform forensic investigations including detecting system executable abnormalities. An embodiment of the present invention may be applied to various operating systems, such as Windows, Mac, Linux, etc. Operating systems may represent a collection of programs that coordinate the operation of computer hardware and software and provide common services for computer programs. An embodiment of the present invention recognizes that certain files such as OS catalogs identify known good files and may be filtered out. The OS catalog identifies what executables are expected and further supports what type of files should not be part of the install. An embodiment of the present invention also identifies unique executable properties that relate to a specific operating system. These properties may identify operating system specific characteristics that may be used to filter known good executables.

20 Claims, 8 Drawing Sheets

(56) References Cited

U.S. PATENT DOCUMENTS

| | | | |
|---|---|---|---|
| 2007/0038998 A1* | 2/2007 | Fries | G06F 11/1469 |
| | | | 718/1 |
| 2007/0085711 A1* | 4/2007 | Bousquet | G06Q 10/10 |
| | | | 341/50 |
| 2009/0164427 A1* | 6/2009 | Shields | H04L 63/12 |
| | | | 707/999.102 |
| 2010/0131770 A1* | 5/2010 | Torrubia | G06F 21/51 |
| | | | 713/176 |
| 2013/0067447 A1* | 3/2013 | Sannidhanam | G06F 8/60 |
| | | | 717/169 |
| 2013/0227692 A1* | 8/2013 | Pavlyushchik | G06F 21/567 |
| | | | 726/24 |
| 2017/0220800 A1* | 8/2017 | Niemelä | H04L 63/1416 |
| 2018/0232387 A1* | 8/2018 | Boutnaru | H04L 67/34 |
| 2019/0199744 A1* | 6/2019 | Nides | H04L 63/0428 |
| 2022/0309041 A1* | 9/2022 | Whitechapel | G06F 8/65 |
| 2024/0007498 A1* | 1/2024 | Kim | H04L 63/20 |

\* cited by examiner

```
PS C:\Temp> .\authenticode_hash.exe - s C:\Temp\powercfg.exe
SHA1 Authenticode Hash: b8xxx30xx29xx7xx354xx1xx2x5x3171943690x5
PS C:\Temp>
```

Figure 3

```
PS C:\Temp> .\pe_dump.exe --catalogdb --source C:\Temp
{"cert_flag":false,"authenticode_sha1":"b8xxx30xx29xx7xx354xx1xx2x5x3171943690x5","sha1_hash":"9xxx16x18xx1650x5x5x7x6xx
83xxx3xxxx963xx","file_path_str":"C:\\Temp\\powercfg.exe","cataogs":"Microsoft-Windows-Client-Desktop-Required-Package0
4111~31xx3856xx364x35~amd64~10.0.19041.804.cat|Microsoft-Windows-Client-Features-Package02~31xx3856xx364x35~amd64~10.0
.19041.804.cat|","cataloged":true}
{"cert_flag":false,"authenticode_sha1":"7x5x3314x03x16xxx1xx82b78963xx23326x77xx7","sha1_hash":"x4xx86x8364x87139x5x9x53x
04xx1x375406x7x","file_path_str":"C:\\Temp\\pe_dump.exe","cataloged":false}
{"cert_flag":false,"authenticode_sha1":"15x50xxxx4x6x85xx4xx752xxx819x12x068x52","sha1_hash":"2x67xxx849x7994476x0x26x1
986117x5367063","file_path_str":"C:\\Temp\\authenticode_hash.exe","cataloged":false}
PS C:\Temp>
```

```
{
    "cert_flag": false,
    "authenticode_sha1": "138fff5xxx7xxx2x8xxx5xx83xx5x728627822c3",
    "sha1_hash": "6b06xxxx478x4xxx50xxx0d33xx6878x943x11xx",
    "file_path_str":
"\\\\.\\F:\\[root]\\Windows\\winsxs\\x86_microsoft-windows-netutils_31xx3856xx364x35_6.1.7601.1751
4_none_3220778xx85xxx05\\netutils.dll",
    "cataloged": true
},
{
    "cert_flag": false,
    "authenticode_sha1": "5147048x5xx09943x8x427442xx4x7522x9xx70x",
    "sha1_hash": "7x562414x6x6xxx22xxx214xxx86109x108xxx8x",
    "file_path_str": "\\\\.\\F:\\[root]\\Windows\\SysWOW64\\netprofm.dll",
    "cataloged": true
}
```

Figure 6

| file_path_str | 21 hits<br>kdr_meta_internal_notes | kdr_meta_tags | + Add tags |
|---|---|---|---|
| ☐ > \\.\F:\[root]\Program Files\Puppet Labs\Puppet\puppet\bin\puppetres.dll | Hash lookup returned data of interest | PostProcessing_Lookup::Malicious::VirusTotal::LastAnalysis | |
| ☐ > \\.\F:\[root]\Program Files (x86)\McAfee\Host Intrusion Prevention\mx1.dll | Hash lookup returned data of interest | PostProcessing_Lookup::Malicious::VirusTotal::TotalVotes, Lookup::Exists::MISP | |
| ☐ > \\.\F:\[root]\Windows\SysWOW64\msvcr71.dll | Hash lookup returned data of interest | PostProcessing_Lookup::Malicious::VirusTotal::TotalVotes, Lookup::Exists::MISP | |
| ☐ > \\.\F:\[root]\Windows\assembly\GAC\ADODB\7.0.3300.0__bxb.dll | Hash lookup returned data of interest | PostProcessing_Lookup::Malicious::VirusTotal::TotalVotes | |

SYSTEM AND METHOD FOR DETECTING SYSTEM EXECUTABLE ABNORMALITIES

CROSS-REFERENCE TO RELATED APPLICATION

This application claims priority to U.S. Provisional Application No. 63/261,966, filed Oct. 1, 2021, the contents of which are incorporated by reference herein in their entirety.

FIELD OF THE INVENTION

The present invention relates to systems and methods for detecting executable abnormalities in various operating systems.

BACKGROUND

Fraud is an ongoing risk for most organizations and entities. As threats to an organization's integrity continue to increase, fraud detection and forensic investigation serve to address such threats. Every industry has experienced an increased and proactive approach to preventing fraud and mitigating consequences of fraud. By applying forensic investigations, breaches and other misconduct can be addressed and even prevented.

A common area of fraud attack is computer hardware and software. Current detection mechanisms are based on event logs and probes and fail to accurately and timely detect potentially threatening events. In addition, hardware and software have unique characteristics and operating requirements that make it difficult to properly identify fraudulent or malicious events.

It would be desirable, therefore, to have a system and method that could overcome the foregoing disadvantages of known systems.

SUMMARY

According to one embodiment, the invention relates to a computer-implemented system for detecting computer system executable abnormalities. The system comprises: an interface that is configured to receive one or more inputs; a memory component that stores and manages an operating system catalog file that comprises metadata for a set of files that relate to a particular operating system; and a computer processor coupled to the interface and the memory component, the computer processor further configured to perform the steps of: accessing a catalog system wherein the catalog system is specific to an operating system; checking an executable against the catalog system to identify a set of known executables; identifying one or more unique executable properties that represent operating system characteristics associated with a specific operating system; excluding at least one of the set of known executables and executables based on the one or more unique properties; identifying one or more insights for unknown executables based on at least one file property; and communicating, via a user interface, the one or more insights.

According to another embodiment, the invention relates to a computer-implemented method for detecting computer system executable abnormalities. The method comprises the steps of: accessing a catalog system wherein the catalog system is specific to an operating system; checking an executable against the catalog system to identify a set of known executables; identifying one or more unique executable properties that represent operating system characteristics associated with a specific operating system; excluding at least one of the set of known executables and executables based on the one or more unique properties; identifying one or more insights for unknown executables based on at least one file property; and communicating, via a user interface, the one or more insights.

An embodiment of the present invention is directed to a system and method that efficiently and effectively detects system executable abnormalities by determining what is expected in a particular operating system to better address fraudulent events. This may involve determining how an operating system functions, including how it redirects executables, for example. An embodiment of the present invention is directed to leveraging an operating system's functions and executable characteristics to filter out known good files to more efficiently and accurately identify potentially bad files for a particular operating system.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

An embodiment of the present invention is directed to performing forensic investigations and detecting system executable abnormalities. An embodiment of the present invention may be applied to various operating systems, such as Microsoft Windows, Mac, Unix, Linux, etc. Operating systems may represent a collection of programs that coordinate the operation of computer hardware and software and provide common services for computer programs. In an exemplary operating system (e.g., Windows OS), there may be various installed applications with an associated hundreds if not thousands of program files that are stored a computer's hard drive. An embodiment of the present invention is directed to leveraging Windows OS functions to filter out known good files to more efficiently and accurately identify potentially bad files on an operating system.

An operating system has a corresponding catalog of what is needed to function as well as a set of associated components. The catalog or manifest file may represent a file containing metadata for a set of accompanying files relevant to the operating system. For each computer program, the catalog or manifest file may include name, version number, license and constituent files of the program. Other variations of the catalog may include package manifest, application manifest, assembly manifest, etc.

For Linux, a manifest file may enumerate the files which are included in a distribution for processing by various packaging tools and/or for user interaction. The manifest file may contain additional information such as package format, version number, entry point for execution, cryptographic hash, checksum, etc.

An application manifest may include a document, such as an XML document, that may be embedded in an executable file or contained in a separate XML file that bears name, version, trust information, privileges required for execution and dependencies on other components.

An assembly manifest may additionally identify assemblies and other components. An assembly manifest may contain a collection of data that describes how the elements in the assembly relate to each other. This may include relationships and dependencies of the components in the assembly. For example, an assembly manifest may contain metadata needed to specify the assembly's version requirements and security identity as well as metadata to define the scope of the assembly and resolve references to resources and classes.

Most operating systems require periodic updates, as needed. For proper updates, the operating system needs to be aware of the corresponding executables and files. Updates may involve an additional hundreds or thousands of executables (e.g., code that runs on a machine). When conducting a forensic investigation, an embodiment of the present invention is directed to finding malicious code running on the machine by applying customized filters to hundreds of thousands of executables.

An embodiment of the present invention recognizes that certain files such as OS catalogs that are part of the operating system install or updates are known good files and may be filtered out. The OS catalog identifies what executables are expected and further supports what types of files should not be part of the install.

An embodiment of the present invention also identifies unique executable properties that exist for any given operating system. These properties may identify operating system specific characteristics that may be used to identify and filter out known good executables. For example, an embodiment of the present invention may recognize that some files are consistent with executables properties that are specific to an operating system, such as Windows. Accordingly, an embodiment of the present invention is directed to identifying malicious executables by narrowing in on files that diverge from what is expected based on operating system specifics. An understanding of an OS catalog and unique executable properties enables an embodiment of the present invention to efficiently and accurately narrow a universe of suspect executables by filtering out what is consistent with known good files.

An embodiment of the present invention is directed to collecting executable insights based on hashes and file properties. This further supports exclusion or in some cases, inclusion of certain files and executables. Insights may be highlighted and communicated to various users through an interactive user interface. For example, insights may be communicated as alerts and/or other messages.

Figure 1:
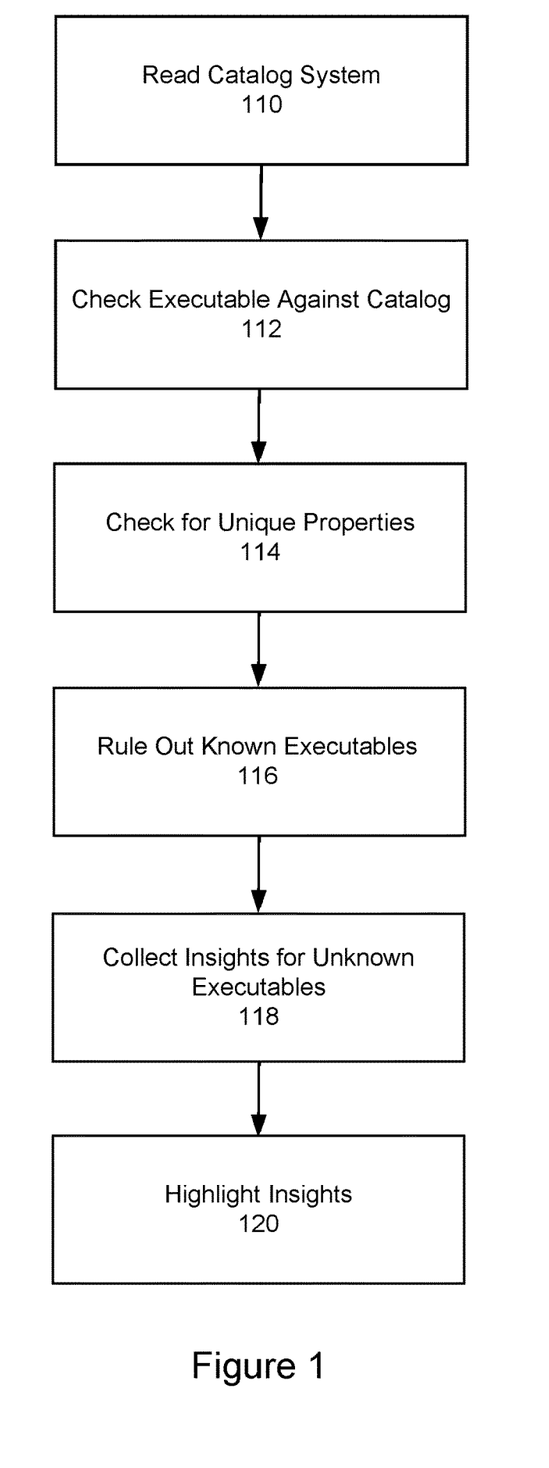
FIG. 1 is an exemplary flow diagram, according to an embodiment of the present invention.

FIG. 1 is an exemplary flow diagram, according to an embodiment of the present invention. At step 110, a catalog system may be accessed and read. This may involve reading an Operating System's (OS) cataloging system that identifies a catalog file, a manifest file, etc. At step 112, system executables may be checked against an OS catalog system. System executables may represent known good files that may be filtered out. For example, the OS catalog file identifies what executables are expected and further identifies types of files that should not be part of an install process. At step 114, unique executable properties may be checked for a given OS. The unique executable properties may identify operating system specific characteristics that may be used to identify and filter out known good executables. At step 116, the system may rule out known OS executables.

At step 118, executable insights may be collected based off of hashes and/or file or executable properties. For example, hashes may be compared to a known bad hash to gain the insight that the executable is malicious. For executable property insights, an embodiment of the present invention may identify abnormalities such as an executable with a "Product name" property listed as a specific operating system, such as "Microsoft Windows Operating System," or a copyright listed as specific entity, such as "Microsoft Corporation," but where the executable has no corresponding certificate, e.g., Microsoft certificate, associated with it. It would be considered unusual for Microsoft not to sign their binaries. Other anomalies or discrepancies may be identified using hashes and/or file or executable properties.

At step 120, insights may be highlighted through a user interface or other communication. Insights may be provided through an alert label displayed by a dashboard or other user interface. The dashboard may display an alert (e.g., hash lookup returned data of interest); path (e.g., directory path such as \\.\G:\[root]\Windows\ . . . ); and corresponding hash.

Figure 2:
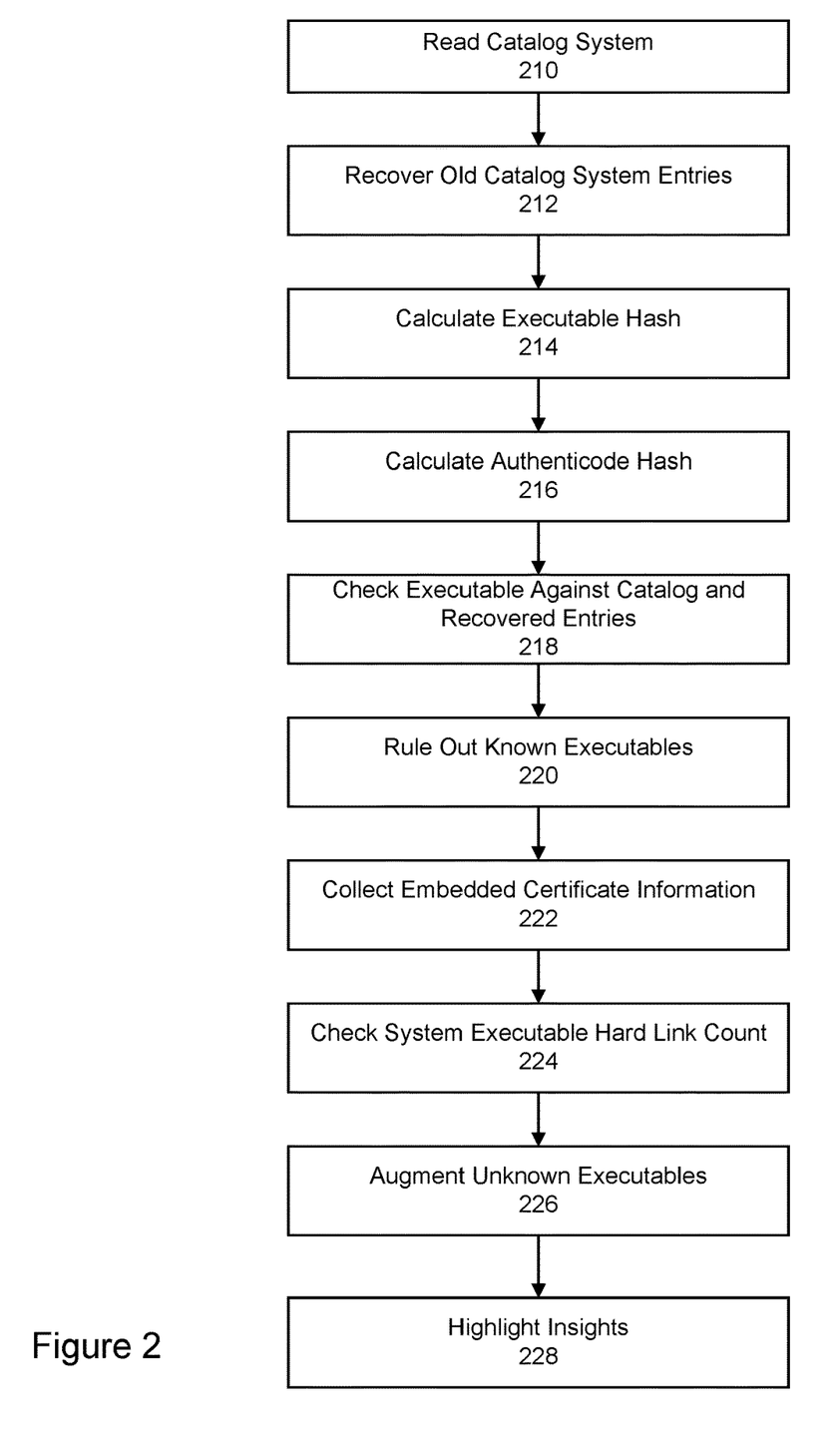
FIG. 2 is an exemplary flow diagram, according to an embodiment of the present invention.

FIG. 2 is an exemplary flow diagram, according to an embodiment of the present invention. An embodiment of the present invention may be applied to various operating systems. An exemplary illustration may involve Microsoft Windows Operating System. In this illustrative example, a Window's catalog database may be read at step 210. At step 212, deleted entries may be recovered in the Window's Catalog Database. A system that recovers deleted entries from the Windows CatalogDB enables more historical lookups thereby increasing the amount of known executables that can be looked up.

At step 214, executable hashes may be calculated. For example, the system may calculate hashes for files. In particular, a hash for an executable may be calculated via system tools or by custom created tools. These tools may implement a given cryptographic standard where an algorithm is used to take binary data and produce a fixed size hash value. In addition, a given calculated hash may or may not be used for lookups in an operating system's catalogs.

At step 216, an Authenticode Hash may be calculated. For example, the system may execute an Authenticode Hashing algorithm for portable executable (PE) files. According to an embodiment of the present invention, an authenticode hashing algorithm may be applied to support a file lookup function within a catalog.

At step 218, executables may be checked against the catalog and recovered entries. For example, in the Windows OS implementation, a catalog database may be used to manage known executables. An embodiment of the present invention may implement proprietary libraries to recover entries in the catalog database. The recovered data may be used to then extend the history of a known executable listing. This provides the ability to exclude additional files as known good files.

For example, an embodiment of the present invention may lookup Authenticode Hashes in Catalog entries. In addition, the system may lookup Authenticode Hashes in the Catalog recovered entries. The system may then determine whether an executable is cataloged by Windows.

At step 220, known executables may be ruled out. By intelligently excluding known executables, an embodiment of the present invention may focus in on a set of executables to analyze.

At step 222, embedded certificate information may be collected. For example, the system may check portable executables (PE) for an embedded certificate. An executable may be signed by a known manufacturer. In addition, embedded certificates are specific to Windows and portable executables (which is a format that Windows uses).

At step 224, a system executable hard link count may be checked. This may involve checking a file's hard links. For example, a system check may be performed for hard links, which is specific to Windows. In Windows, certain folders may contain OS executables. The folders may contain a path that points to files. An embodiment of the present invention may be applied to identify anomalies by determining whether hard links are detected. If hard links are not detected (but rather executables are stored in system folders), an embodiment of the present invention may identify a potential issue given the technical intricacies of Windows. Any inconsistency may be flagged as a potential issue. Other executable counts may be checked.

At step 226, unknown executables may be augmented. The system may augment executable information with hashes. Augmented data may contain information such as whether an executable has been marked as malicious from prior analysis or community voting, whether the executable is known or trusted, and/or additional information about the executable's signature. Accordingly, augmented data may provide insights into the need for further analysis. In addition, known executables may be augmented in a similar manner.

At step 228, insights may be highlighted. The system may highlight executable insights through an interactive user interface.

An embodiment of the present invention is directed to collecting across many systems to build a repository. This feature may expand types of data to exclude. An embodiment of the present invention may support a database of catalog files across various systems, operating systems, etc. Analysis from the data may support an additional layer of filtering so that users may collect insights for unknown executables phases.

For example, the database may collect hashes across multiple catalogs to support a large variety of systems. An embodiment of the present invention is directed to a service that collects additional insights based on a large knowledge base.

An embodiment of the present invention is directed to operating system executable anomalies. The innovative system may be a standalone system or service and may be integrated with a suite of services and/or tools. An exemplary implementation may integrate with automatic collection, analysis and data reporting systems, as described in U.S. Pat. No. 11,075,935, entitled "System and Method for Identifying Cybersecurity Threats," filed Dec. 22, 2017, and continuation U.S. Pat. No. 11,381,592, entitled "System and Method for Identifying Cybersecurity Threats," filed Jun. 18, 2021, the contents of which are incorporated by reference herein in their entirety.

Figure 3:
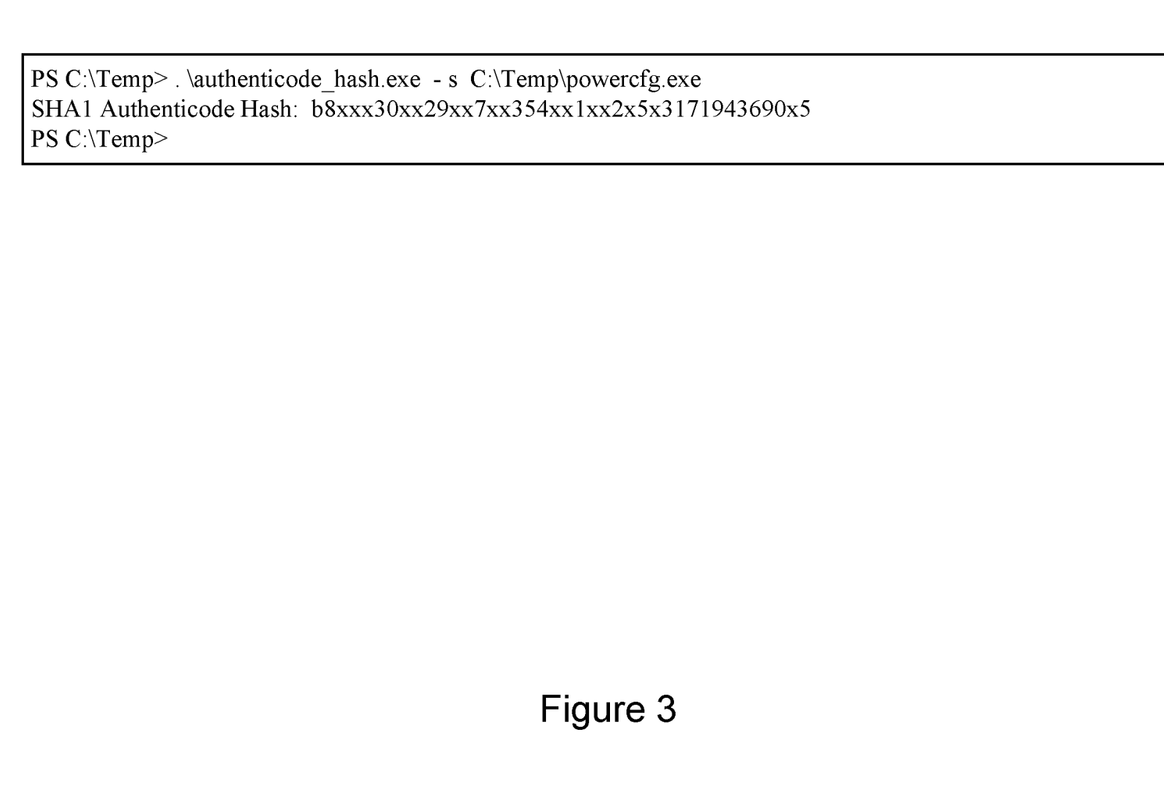
FIG. 3 is an exemplary user interface, according to an embodiment of the present invention.

FIG. 3 is an exemplary user interface, according to an embodiment of the present invention. FIG. 3 illustrates a Windows implementation example screen capture. FIG. 3 represents an exemplary interface that calculates authenticode hash.

Figure 4:
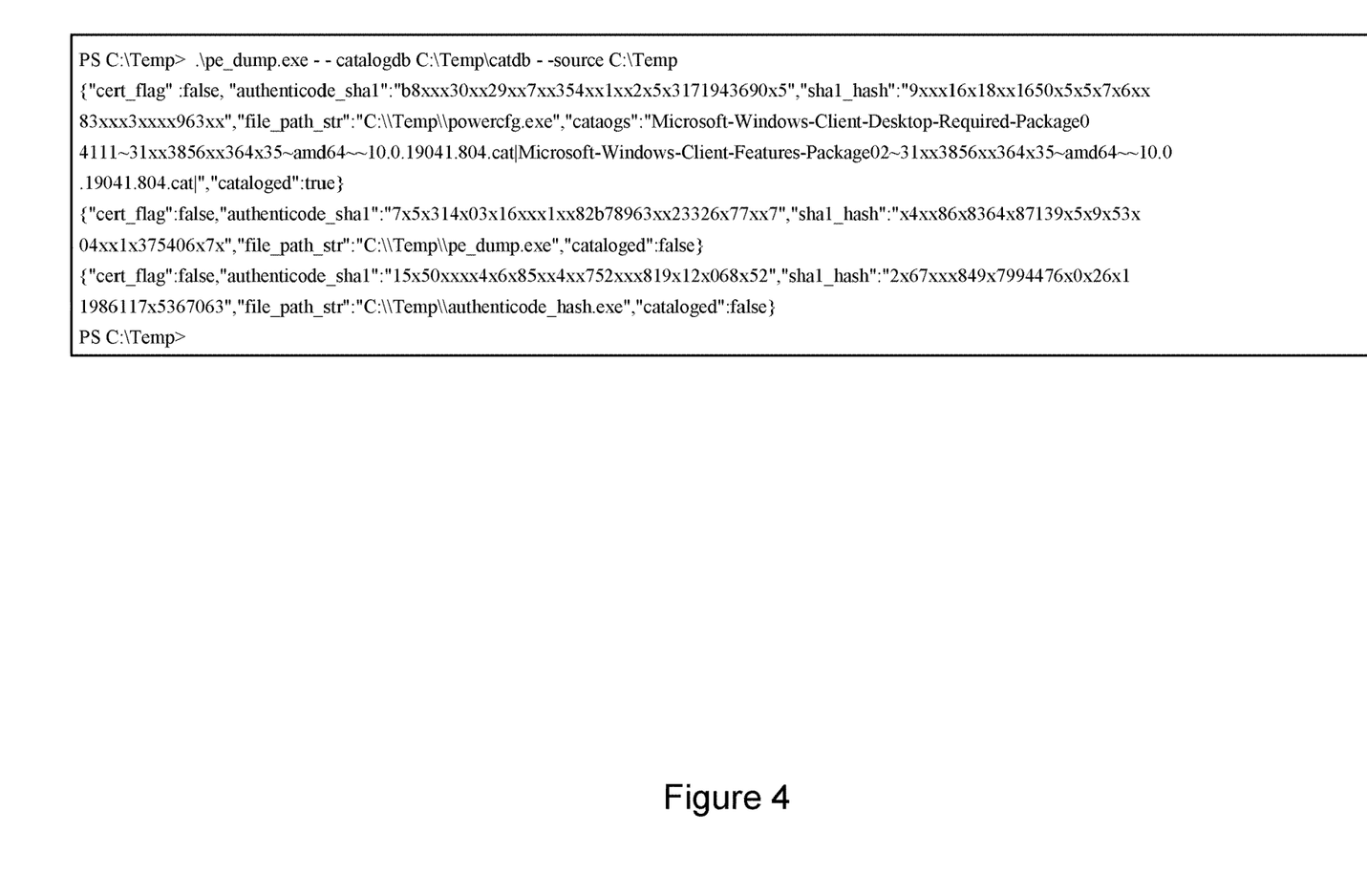
FIG. 4 is an exemplary user interface, according to an embodiment of the present invention.

FIG. 4 is an exemplary user interface, according to an embodiment of the present invention. FIG. 4 illustrates a Windows implementation example screen capture. FIG. 4 represents an exemplary interface that reads and recovers the Windows CatalogDB entries. An embodiment of the present invention also calculates Hashes and Authenticode Hashes for an executable. The system looks up the Authenticode hash in the Windows CatalogDB and determines if the executable is cataloged. The system may then read the embedded certificate.

Figure 5:
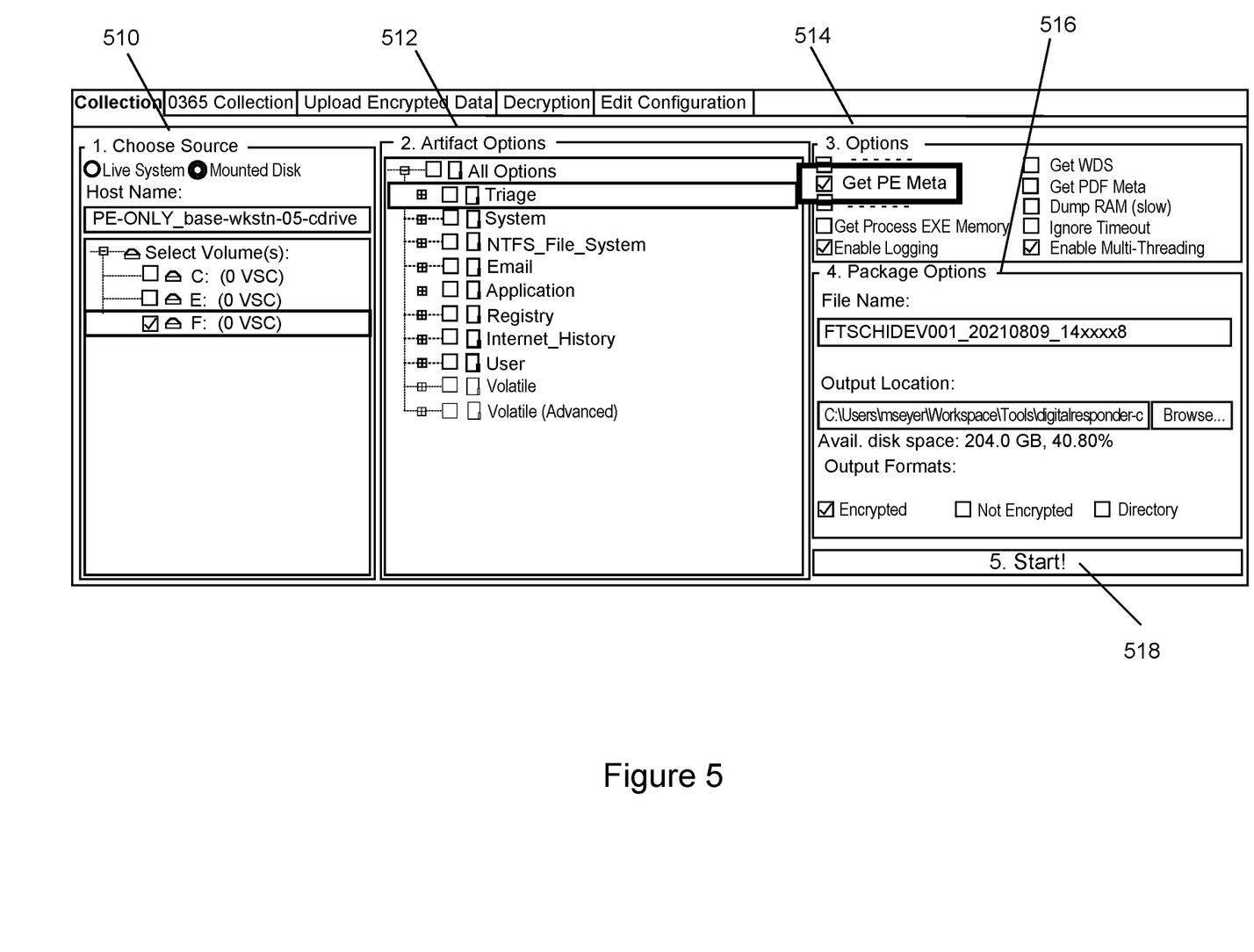
FIG. 5 is an exemplary user interface, according to an embodiment of the present invention.

FIG. 5 is an exemplary user interface, according to an embodiment of the present invention. FIG. 5 illustrates a Windows implementation example screen capture. FIG. 5 represents an implementation as an embedded system. As shown in FIG. 5, a user may choose a source at 510, identify artifact options at 512, identify an additional set of options at 514, identify package options at 516 and then initiate the process at 518.

Figure 6:
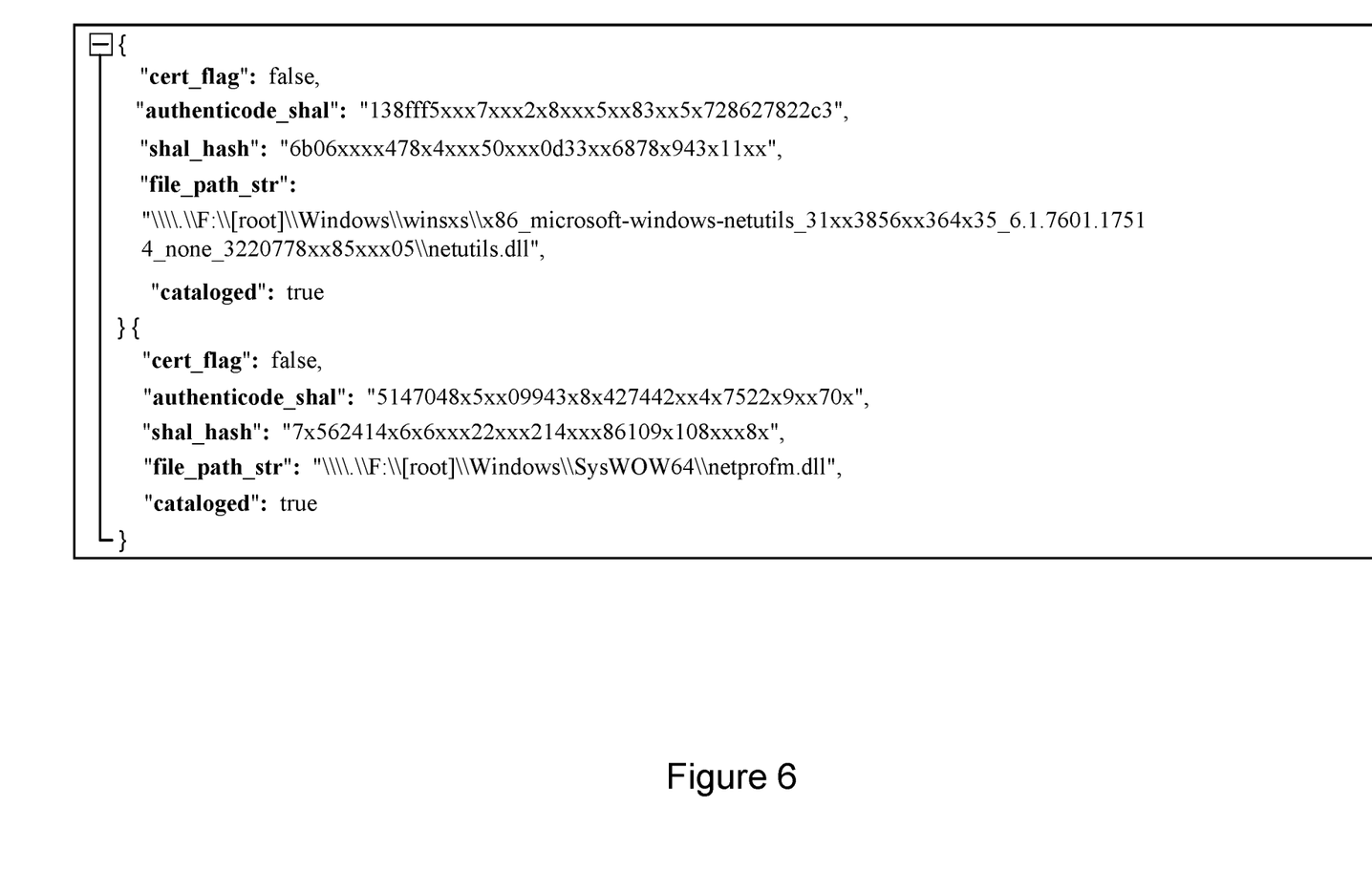
FIG. 6 is an exemplary user interface, according to an embodiment of the present invention.

FIG. 6 is an exemplary user interface, according to an embodiment of the present invention. FIG. 6 illustrates a Windows implementation example screen capture. FIG. 6 represents an output example.

Figure 7:
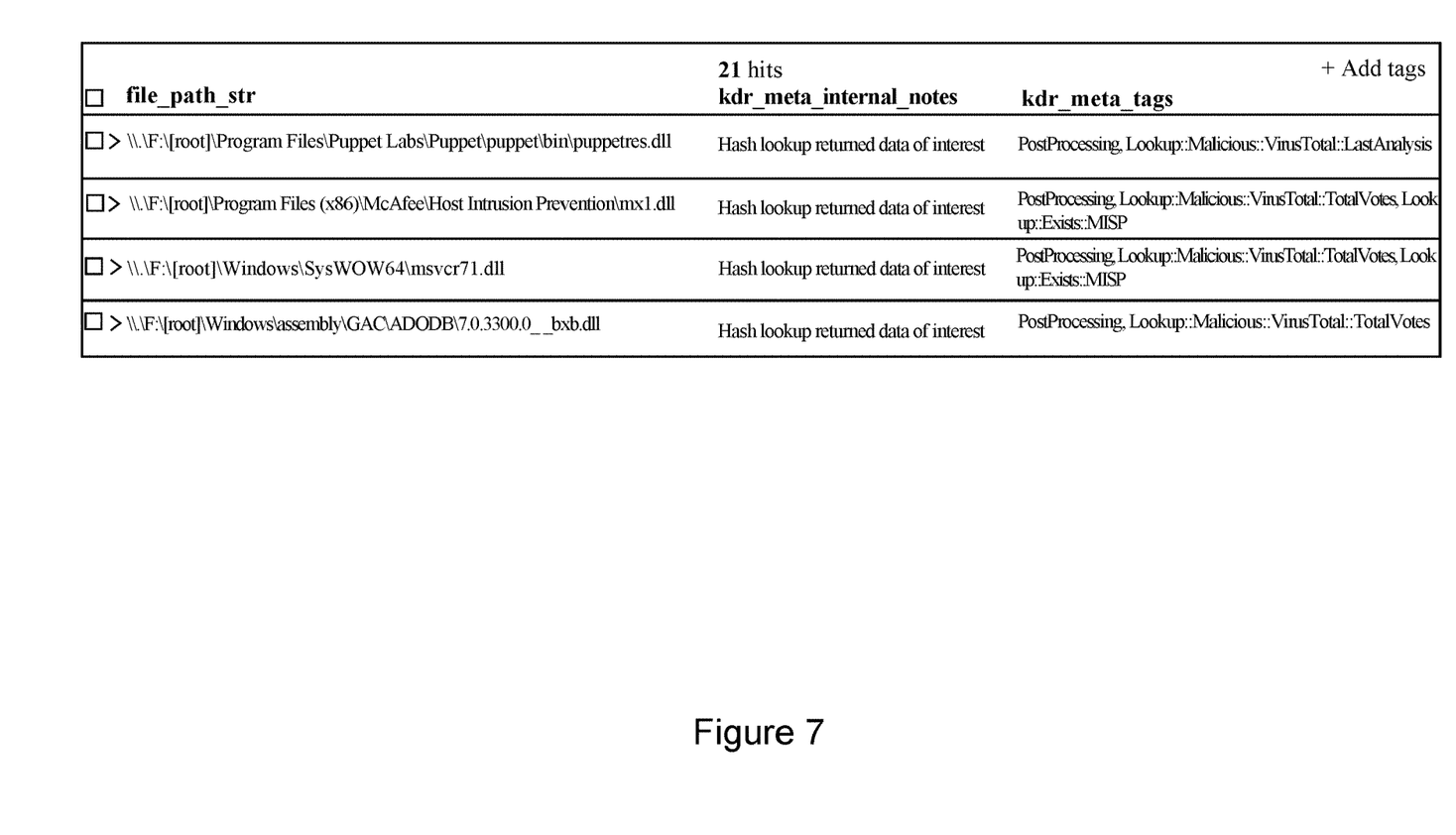
FIG. 7 is an exemplary user interface, according to an embodiment of the present invention.

FIG. 7 is an exemplary user interface, according to an embodiment of the present invention. FIG. 7 illustrates a Windows implementation example screen capture. FIG. 7 represents a system that augments executable information with hashes and highlights executable insights where "file_path_str" is the path of the file, the "kdr_meta_internal_notes" is the alert, and the "kdr_meta_tags" are the insights based off the hash that represents the "file_path_str".

Figure 8:
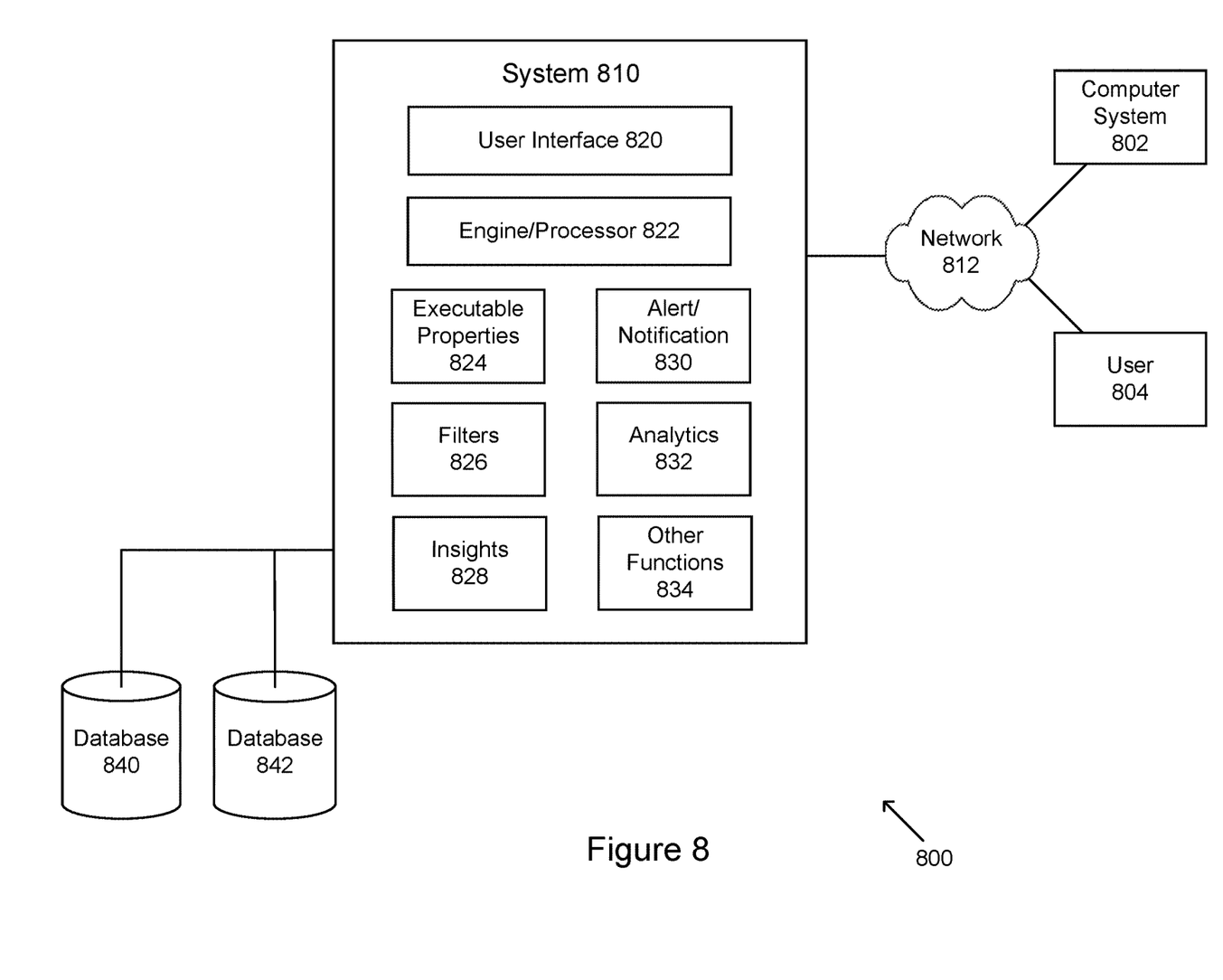
FIG. 8 is an exemplary system diagram, according to an embodiment of the present invention.

FIG. 8 is an exemplary system diagram, according to an embodiment of the present invention. System 810 supports various functions including detecting system executable abnormalities. Computer System 802 and User 804 may communicate with System 810 via Network 812. System 810 may communicate and integrate with other devices and support various configurations and architectures. For example, System 800 may support forensic investigations as well as other applications and uses.

System 810 may include User Interface 820 that supports various interactions on devices including mobile devices, other devices, computers, laptops, tablets, etc. User Interface 820 may enable users and/or other entities and systems to interact with Engine/Processor 822. User Interface 820 may support various applications including browsers, mobile interfaces, dashboards, interactive interfaces, etc.

Engine/Processor 822 may support various functions and processes via modules including Executable Properties 824, Filters 826, Insights 828, Alert/Notification 830, Analytics 832, etc. Other functions and features represented by 834 may be supported in various forms and implementations.

Executable Properties 824 may identify known good files, such as expected executables as well as information relating to the type of files that are expected. Executable Properties 824 may also identify unique executable properties that may be specific to an operating system.

Filters 826 may be applied to efficiently and accurately narrow a universe of suspect executables by filtering out expected executables and files and data that are consistent with known good files properties and/or characteristics.

Insights 828 may be collected based on hashes and file properties. Insights may be communicated through User Interface 820 as well as other modes of communication.

Alert/Notification 830 may provide a communication relating to an event. This may include insights, messages, warnings, etc.

Analytics 832 may track and analyze system executable data. In addition, system activity and performance may be tracked and managed. Analytics may be applied for a specific operating system as well as across multiple operating systems. This information may also be used to further refine the process and improve accuracy and efficiency through machine learning and/or artificial intelligence.

System 810 may store and manage data in various formats, including Databases 840, 842. Data may relate to catalogs, such as OS catalog files, etc. Data may also include known executables, performance data, etc. In addition, Databases 840, 842 may manage catalog files from multiple different operating systems.

System 810 may be communicatively coupled to Databases 840, 842. Databases 840, 842 may include any suitable data structure to maintain the information and allow access and retrieval of the information. Databases 840, 842 may be any suitable storage device or devices. The storage may be local, remote, or a combination thereof with respect to Databases 840, 842. Databases 840, 842 may have back-up capability built-in. Communications with Databases 840, 842 may be over a network, or communications may involve a direct connection between Databases 840, 842 and System 810, as depicted in FIG. 8. Databases 840, 842 may also represent cloud or other network based storage.

Networks may be a wireless network, a wired network or any combination of wireless network and wired network. Although Network 812 is depicted as one network for simplicity, it should be appreciated that according to one or more embodiments, Network 812 may comprise a plurality of interconnected networks, such as, for example, a service provider network, the Internet, a cellular network, corporate networks, or even home networks, or any of the types of networks mentioned above. Data may be transmitted and received via Network 812 utilizing a standard networking protocol or a standard telecommunications protocol.

While FIG. 8 illustrates individual devices or components, it should be appreciated that there may be several of such devices to carry out the various exemplary embodiments. Users may communicate with various entities using any mobile or computing device, such as a laptop computer, a personal digital assistant, a smartphone, a smartwatch, smart glasses, other wearables or other computing devices capable of sending or receiving network signals.

The system 800 of FIG. 8 may be implemented in a variety of ways. Architecture within system 800 may be implemented as hardware components (e.g., module) within one or more network elements. It should also be appreciated that architecture within system 800 may be implemented in computer executable software (e.g., on a tangible, non-transitory computer-readable medium) located within one or more network elements. Module functionality of architecture within system 800 may be located on a single device or distributed across a plurality of devices including one or more centralized servers and one or more mobile units or end user devices. The architecture depicted in system 800 is meant to be exemplary and non-limiting. For example, while connections and relationships between the elements of system 800 are depicted, it should be appreciated that other connections and relationships are possible. The system 800 described below may be used to implement the various methods herein, by way of example. Various elements of the system 800 may be referenced in explaining the exemplary methods described herein.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements.

The foregoing descriptions provide examples of different configurations and features of embodiments of the invention. While certain nomenclature and types of applications/hardware are described, other names and application/hardware usage is possible and the nomenclature is provided by way of non-limiting examples only. Further, while particular embodiments are described, it should be appreciated that the features and functions of each embodiment may be combined in any combination as is within the capability of one skilled in the art. The figures provide additional exemplary details regarding the various embodiments.

Various exemplary methods are provided by way of example herein. The methods described can be executed or otherwise performed by one or a combination of various systems and modules.

The use of the term computer system in the present disclosure can relate to a single computer or multiple computers. In various embodiments, the multiple computers can be networked. The networking can be any type of network, including, but not limited to, wired and wireless networks, a local-area network, a wide-area network, and the Internet.

According to exemplary embodiments, the System software may be implemented as one or more computer program products, for example, one or more modules of computer program instructions encoded on a computer-readable medium for execution by, or to control the operation of, data processing apparatus. The implementations can include single or distributed processing of algorithms. The computer-readable medium can be a machine-readable storage device, a machine-readable storage substrate, a memory device, or a combination of one or more them. The term "processor" encompasses all apparatus, devices, and machines for processing data, including by way of example a programmable processor, a computer, or multiple processors or computers. The apparatus can include, in addition to hardware, software code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed for execution on one computer or on multiple computers that are located at one site or distributed across multiple sites and interconnected by a communications network.

A computer may encompass all apparatus, devices, and machines for processing data, including by way of example a programmable processor, a computer, or multiple processors or computers. It can include, in addition to hardware, code that creates an execution environment for the computer program in question, e.g., code that constitutes processor firmware, a protocol stack, a database management system, an operating system, or a combination of one or more of them.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computer-readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While the embodiments have been particularly shown and described within the framework for conducting analysis, it will be appreciated that variations and modifications may be affected by a person skilled in the art without departing from the scope of the various embodiments. Furthermore, one skilled in the art will recognize that such processes and systems do not need to be restricted to the specific embodiments described herein. Other embodiments, combinations of the present embodiments, and uses and advantages of the will be apparent to those skilled in the art from consideration of the specification and practice of the embodiments disclosed herein. The specification and examples should be considered exemplary.

What is claimed is:

1. A computer-implemented system for detecting malicious code in computer system executables, the system comprising:
   an interface that is configured to receive one or more inputs;
   a memory component that stores and manages an operating system catalog file that comprises metadata for a set of files that relate to a particular operating system; and
   a computer processor coupled to the interface and the memory component, the computer processor further configured to perform the steps of:
      narrowing a list of files to be scanned for malicious content by:
         accessing and reading an operating system's cataloging system wherein the cataloging system identifies a catalog file containing metadata and a manifest file, the manifest file being an XML document comprising metadata identifying (i) one or more version requirements, (ii) a security identity, and (iii) relationships between one or more resources and classes;
      checking a plurality of executables on a system against the catalog file based on the catalog file's identification of expected executables to identify a set of known good executables;
      checking the plurality of executables on the system to identify one or more unique executable properties that represent specific characteristics for the operating system, including identifying abnormalities in executable properties where an executable has a product name or copyright associated with the operating system but lacks corresponding certificates; and
      excluding each executable from the plurality of executables that is a verified executable and that has one or more unique executable properties;
   selectively generating a list of unknown executables;
   identifying one or more insights for at least one of the unknown executables based on at least one file property; and
   transmitting, via a user interface, the list of at least one unknown executables and the corresponding one or more insights.

2. The system of claim 1, wherein the operating system comprises one of: Microsoft Windows, Unix and Linux operating systems.

3. The system of claim 1, wherein the catalog file comprises at least one of: package manifest, application manifest and assembly manifest.

4. The system of claim 1, wherein the computer processor is further configured to perform the step of: recovering one or more deleted entries from the cataloging system to identify one or more additional known executables.

5. The system of claim 1, wherein the computer processor is further configured to perform the step of: calculating one or more executable hashes.

6. The system of claim 1, wherein the computer processor is further configured to perform the step of: calculating one or more authenticode hashes by applying an authenticode hashing algorithm to support a file lookup function within the cataloging system.

7. The system of claim 1, wherein the computer processor is further configured to perform the step of: identifying at least one portable executable from the plurality of executables on the system for an embedded certificate.

8. The system of claim 1, wherein the computer processor is further configured to perform the step of: checking a system executable hard link count.

9. The system of claim 1, wherein the at least one of set of known executables is augmented with one or more hashes that identify one or more of: whether the executable has been previously marked malicious, whether the executable is known or trusted, and whether the executable has a signature.

10. The system of claim 1, wherein the memory component represents a database comprising a plurality of catalog files associated with multiple different operating systems.

11. A computer-implemented method for detecting malicious code in computer system executables, the method comprising the steps of:
    narrowing a list of files to be scanned for malicious content by:
       accessing and reading an operating system's cataloging system wherein the cataloging system identifies a catalog file containing metadata and a manifest file, the manifest file being an XML document comprising metadata identifying (i) one or more version requirements, (ii) a security identity, and (iii) relationships between one or more resources and classes;

checking a plurality of executables on a system against the catalog file based on the catalog file's identification of expected executables to identify a set of known good executables;

checking the plurality of executables on the system to identify one or more unique executable properties that represent specific characteristics for the operating system, including identifying abnormalities in executable properties where an executable has a product name or copyright associated with the operating system but lacks corresponding certificates; and excluding each executable from the plurality of executables that is a verified executable and that has one or more unique executable properties;

selectively generating a list of unknown executables;

identifying one or more insights for at least one of the unknown executables based on at least one file property; and transmitting, via a user interface, the list of at least one unknown executables and the corresponding one or more insights.

12. The method of claim 11, wherein the operating system comprises one of: Microsoft Windows, Unix and Linux operating systems.

13. The method of claim 11, wherein the catalog file comprises at least one of: package manifest, application manifest and assembly manifest.

14. The method of claim 11, further comprising the step of:

recovering one or more deleted entries from the cataloging system to identify one or more additional known executables.

15. The method of claim 11, further comprising the step of: calculating one or more executable hashes.

16. The method of claim 11, further comprising the step of: calculating one or more authenticode hashes by applying an authenticode hashing algorithm to support a file lookup function within the cataloging system.

17. The method of claim 11, further comprising the step of: identifying at least one portable executable from the plurality of executables on the system for an embedded certificate.

18. The method of claim 11, further comprising the step of: checking a system executable hard link count.

19. The method of claim 11, wherein the at least one of the set of known executables is augmented with one or more hashes that identify one or more of: whether the executable has been previously marked malicious, whether the executable is known or trusted, and whether the executable has a signature.

20. The method of claim 11, further comprising the step of: storing and managing a plurality of catalog files that comprises metadata for a set of files that relate to a particular operating system wherein the plurality of catalog files are associated with multiple different operating systems.

* * * * *